(12) United States Patent
Higgins et al.

(10) Patent No.: US 8,398,226 B2
(45) Date of Patent: *Mar. 19, 2013

(54) INKJET PRINTING SYSTEM

(75) Inventors: John M. Higgins, Cambridge (GB); Danuta Gibson, Reach (GB); Andrew M. Howe, Cambridge (GB); Andrew Clarke, Haslingfield (GB); Stephanie V. Desrousseaux, Cambridge (GB); Trevor J. Wear, Ely (GB)

(73) Assignee: Eastman Kodak Company, Rochester, NY (US)

( * ) Notice: Subject to any disclaimer, the term of this patent is extended or adjusted under 35 U.S.C. 154(b) by 638 days.

This patent is subject to a terminal disclaimer.

(21) Appl. No.: 12/477,310

(22) Filed: Jun. 3, 2009

(65) Prior Publication Data
US 2009/0322811 A1 Dec. 31, 2009

(30) Foreign Application Priority Data

Jun. 26, 2008 (GB) .................................. 0811712.9

(51) Int. Cl.
*B41J 2/01* (2006.01)
(52) U.S. Cl. ........................... 347/101; 347/96; 347/102
(58) Field of Classification Search .................. 347/5, 9, 347/15, 96, 101, 98, 102
See application file for complete search history.

(56) References Cited

U.S. PATENT DOCUMENTS

| 4,939,992 | A | 7/1990 | Bird |
| 6,026,748 | A | 2/2000 | Reed et al. |
| 7,275,818 | B2 * | 10/2007 | Figov et al. ................... 347/101 |
| 7,762,657 | B2 * | 7/2010 | Tokita et al. ................... 347/96 |
| 2005/0185040 | A1 | 8/2005 | Nagashima |
| 2006/0284949 | A1 * | 12/2006 | Smith et al. ................... 347/102 |

FOREIGN PATENT DOCUMENTS

| GB | 2390332 | 1/2004 |
| WO | 99/07796 | 2/1999 |
| WO | 2008/075049 | 6/2008 |

* cited by examiner

*Primary Examiner* — Lam S Nguyen
(74) *Attorney, Agent, or Firm* — Andrew J. Anderson

(57) ABSTRACT

An inkjet printing system comprising a plurality of static inkjet printing units each comprising at least one inkjet printing head; an ink-receiving element comprising a poorly-absorbing or impermeable substrate; an aqueous inkjet composition which comprises a polymeric compound comprising discrete particles responsive to an external stimulus, and a functional material, which may be incorporated as part of the polymeric particles, the composition having a first rheological state and a different second rheological state in response to a stimulated change in conditions, the first state being associated with a first lower viscosity of the composition, wherein the particles have a first lower volume, and the second state being associated with a second higher viscosity of the composition, wherein the particles have a second higher volume, and of drying the aqueous ink composition only positioned downstream of the plurality of the printing units.

20 Claims, 4 Drawing Sheets

INKJET PRINTING SYSTEM

FIELD OF THE INVENTION

The present invention relates to an inkjet printing system with a plurality of printing units using aqueous ink compositions suitable for inkjet systems, particularly continuous inkjet systems, for printing onto poorly-absorbing or impermeable substrates, and including a means of drying positioned only downstream of the plurality of printing units

BACKGROUND OF THE INVENTION

Inkjet printing is a non-impact method for producing images by the deposition of ink droplets in a pixel-by-pixel manner to an image-recording element in response to digital signals. It is used widely for commercial and business applications for printing on various substrates from paper to cable marking or wide format vinyl sheeting and across markets ranging from industrial labelling to short-run printing to desktop document and pictorial imaging.

There are various methods which may be utilized to control the deposition of ink droplets on the image-recording element to yield the desired image. In one process, known as continuous inkjet, ink is supplied under pressure through orifices that produce jets of ink which break up into a continuous stream of droplets which may be of different sizes. The droplets are subsequently sorted such that some droplets form the image whereas others are caught and recirculated. For example, droplets can be selectively charged as a means of sorting or their size can be selectively varied to allow them to be sorted by selective deflection using a stream of air. The droplets that have been caught can then be recycled from the catcher and redispersed within the bulk ink.

In another process, known as drop-on-demand inkjet, individual ink droplets are projected as needed onto the image-recording element to form the desired image. Common methods of controlling the projection of ink droplets in drop-on-demand printing include piezoelectric transducers and thermal bubble formation.

The inks used in the various inkjet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in either case. Commonly used carrier media include water, organic solvents such as alcohols, ketones or hydrocarbons, as well as mixtures of water and organic co-solvents, such as alcohols, esters and ketones.

An important characteristic of inkjet printing is the need to control the ink on the surface of the substrate onto which it is deposited. In the case of common inkjet recording elements, an important factor in achieving this is the absorption of significant portions of the ink, particularly the carrier medium, into some part of the substrate structure. As a consequence, the printed image can appear to be dry immediately after printing and the absorbed liquid can evaporate later. This allows organic solvents and co-solvents with low boiling points to be usefully incorporated into ink formulations, particularly for drop-on-demand inkjet printing.

Inkjet printing in the home or small office involves printing aqueous inks onto porous substrates, such as paper, and is usually sufficiently slow to allow the ink to be absorbed into the substrate, thereby appearing to be almost instantly dry and not to require a drier. Commercial inkjet printing, such as is done for transactional or promotional applications, can however be very much faster and can involve the use of poorly-absorbing or even impermeable substrates. Such printers generally incorporate some means of immobilising, drying or otherwise solidifying the printed droplets to avoid undesirable droplet interactions.

One of the advantages of inkjet printing is that it is a non-contact method and can be used to print onto a wide range of surface topography. However, the nature of the surface, particularly its surface energy, can still present difficulties. The surface energy quantifies the disruption of chemical bonds that occurs when a surface is created. It is the interaction between the forces of cohesion and the forces of adhesion which determines whether or not wetting occurs. If complete wetting does not occur, then a bead of liquid will form with a contact angle which is a function of the surface energies of the system.

Successful printing is normally achieved by applying inks with a surface tension lower then the surface energy of the surface. Unfortunately water has a very high surface tension, which makes it particularly difficult to apply satisfactorily as droplets onto low energy, impermeable surfaces, such as plastic.

Thus, liquid absorption does not occur when printing onto impermeable substrates and in this case either a very fast drying process is applied, much more volatile organic solvents are used as a major component of the carrier medium, or the ink droplets undergo some kind of phase-change on the substrate. All of these practices have significant disadvantages. For example, many impermeable substrates are heat-sensitive, many volatile organic compounds raise concerns about health and safety and phase-change inks produce significantly thicker printed layers because most of the ink droplet is solidified.

The deposition of aqueous inkjet inks can therefore be problematical as they are either not capable of sufficiently wetting the substrate or do not dry quickly enough at the speeds used in inkjet printing, especially in continuous inkjet printing wherein the time between successive drops is very significantly shorter than for drop-on demand inkjet systems. As a result the ink droplets can wick, bleed or coalesce on some substrates, even some kinds of paper, and particularly on such impermeable substrates. Moreover, this tendency is exacerbated by the fast print speeds, high ink coverages, low surface energy surfaces and overlapping drops.

This problem can be avoided by using other kinds of ink, but these are usually non-aqueous. For example, non-aqueous radiation curable inks have been disclosed in patent application WO 99/07796, whereby the droplets are 'cured' or solidified by a chemical reaction initiated by an exposure, for example, to ultra-violet radiation. However the printed image may be insufficiently hardened or curing may continue after the initial curing time under the radiation source.

GB patent application No. 2390332 discloses a method of printing a plurality of radiation-curable droplet patterns, whereby the first pattern is immobilised before subsequent patterns are deposited. US patent application publication no. 2005/0185040A1 shows a means of immobilising droplets immediately downstream of a printing unit to avoid undesirable droplet interactions. FIG. 1 thereof shows the need for a plurality of ultra-violet laser scanners used with a plurality of printing units so that the droplets patterns are immobilised immediately after each deposition. Such ultra-violet laser scanners, which cause the ink droplets to solidify, are positioned immediately after a first printing unit and before a second printing unit, in what is referred to as an 'interstation' position. In another example, U.S. Pat. No. 4,939,992 shows the necessity to use forced hot-air interstation driers positioned after each of several successive flexographic printing units. U.S. Pat. No. 6,026,748 shows the necessity to use infra-red interstation driers positioned after each of several successive printing units.

An aqueous inkjet ink composition that can adhere to a wide range of surfaces, and in particular to impermeable substrates, is disclosed in WO 2008/075049, the disclosure of which is incorporated herein by reference. The compositions disclosed therein include discrete particles responsive to an external stimulus and having a lower viscosity in the printhead, such that the ink composition is conveniently jettable, and a higher viscosity in response to a stimulated change of conditions as the droplets are immobilised on the substrate.

PROBLEM TO BE SOLVED BY THE INVENTION

Commercial inkjet printing can be a relatively fast process but as aqueous inkjet ink compositions are usually low viscosity fluids, containing substantial quantities of vehicle, solvents or other addenda, it is often very difficult to obtain high quality images if wet ink is printed so that it touches wet ink, particularly if the substrate is poorly-absorbing or impermeable. This can be especially noticeable when relatively large amounts of different coloured inks are applied sequentially for colour printing.

While printing can be done by passing the printheads over the printed surface multiple times, the highest inkjet printing speeds are usually achieved by building up a printed image by applying successive patterns of ink droplets onto a moving substrate using a plurality of static inkjet printing units. This requires some means of immobilising one pattern of printed droplets, at least partially, before another is applied when the substrate is poorly-absorbing or impermeable. If this is not done and wet fluid droplets touch one another then image quality is usually severely degraded, particularly if the droplets are different colours, as the droplets merge or coalesce.

Printing devices with a plurality of printheads require a plurality of interstation drying or curing units when poorly-absorbing or impermeable substrates are used, thereby increasing the printing system cost, complexity and energy consumption, as well as increasing the floor area occupied by the system. Image registration is a critical parameter when more than one printing units is used. Incorporating interstation units significantly increases the distance between printing units thereby increasing the difficulty in maintaining correct image registration. In addition, the speed of printing can be limited by the need to immobilise the printed ink between each droplet pattern.

Therefore, there is a need for a means of printing patterns of aqueous ink droplets quickly and efficiently using a plurality of printing units, without also having to provide a plurality of interstation units in order to prevent undesirable printing artefacts.

SUMMARY OF THE INVENTION

In accordance with the present invention there is provided an inkjet printing system comprising (a) a plurality of static inkjet printing units each comprising at least one inkjet printhead; (b) an ink-receiving element comprising a poorly-absorbing or impermeable substrate; (c) an aqueous inkjet composition which comprises a polymeric compound comprising discrete particles responsive to an external stimulus, and a functional material, wherein the functional material may be incorporated as part of the polymeric particles, the particles causing the composition to have a first rheological state and a different second rheological state in response to a stimulated change in conditions, the first rheological state being associated with a first lower viscosity of the composition, wherein the particles have a first lower volume, enabling the composition to pass through an inkjet printhead orifice and the second rheological state being associated with a second higher viscosity of the composition, wherein the particles have a second higher volume, enabling immobilisation of droplets of the composition on a substrate therefor; and (d) means of drying the aqueous ink composition only positioned downstream of the plurality of printing units.

There is also provided an inkjet printing method comprising the steps of

A) providing an ink jet printer comprising a plurality of static inkjet printing units each comprising at least one inkjet printhead, the printing units being responsive to digital data signals;

B) loading the printer with an ink-receiving element comprising a poorly-absorbing or impermeable substrate;

C) loading the printer with an aqueous inkjet ink composition as described above;

D) using a first printing unit, applying a first pattern of droplets on the ink-receiving element using the aqueous inkjet ink composition in response to the digital data signals;

E) using subsequent printing unit or units, directly applying subsequent patterns of droplets on the same ink-receiving element using the aqueous inkjet ink composition in response to the digital data signals; and F) subsequently drying the patterns of droplets.

ADVANTAGEOUS EFFECT OF THE INVENTION

Printing patterns of droplets quickly requires some kind of intermediate intervention between successive patterns to prevent the droplets interactions that produce undesirable printing artefacts when the substrate is poorly-absorbing or impermeable. This situation is avoided through the use of the present invention which provides an inkjet printing system comprising a plurality of printing units, positioned as close as is practicable one after the other, that deposit successively patterns of droplets, especially patterns wherein two or more droplets touch. No intermediate intervention, such as interstation drying or curing, is made between the printed pattern deposited by one printing unit and the next. Furthermore the means of drying is located only after or 'downstream' the plurality of printing units, thereby reducing the cost, complexity, energy consumption and footprint of the printing device and potentially increasing printing speed and improving image registration. In addition, any individual droplet pattern can contain arrangements of touching droplets which allows greater flexibility in the printing process.

DETAILED DESCRIPTION OF THE INVENTION

Figure 1A:
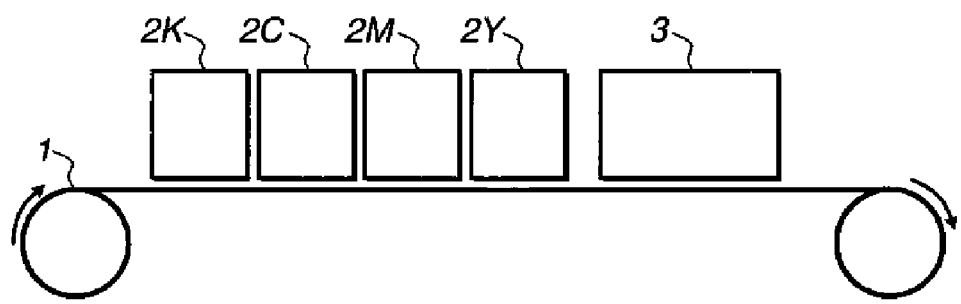
FIG. 1 shows two embodiment of the invention, each of which includes a printing system comprising a plurality of static inkjet printing units (2), each including at least one inkjet printhead, a poorly-absorbing or impermeable substrate (1) and means of drying (3) the droplet patterns deposited by any of the printing units, only located downstream of the printing units, the drying means being positioned on either side relative to the substrate.

An important characteristic of inkjet printing is the need to control the ink on the surface of the substrate onto which it is deposited. This is particularly difficult to achieve using aqueous inkjet inks when deposited, in particular, on poorly-absorbing or impermeable surfaces. WO 2008/075049 discloses an aqueous inkjet composition which comprises a polymeric compound comprising discrete particles responsive to an external stimulus, and a functional material, wherein the functional material may be incorporated as part of the polymeric particles, the particles causing the composition to have a first rheological state and a different second rheological state in response to the stimulated change in conditions, the first rheological state being associated with a first lower viscosity of the composition, wherein the particles have a first lower volume, enabling the composition to pass through an inkjet printhead orifice and the second rheological state being associated with a second higher viscosity of the composition, wherein the particles have a second higher volume, enabling immobilisation of droplets of the composition on a substrate therefor.

In the case of common inkjet recording elements, an important factor in controlling ink on the surface of substrates is the absorption of significant portions of the ink, particularly the carrier medium, into some part of the substrate structure. Some porous substrates, defined herein and throughout the specification as 'poorly-absorbing', do not absorb ink quickly or completely and as a consequence undesirable printing artefacts result, particularly coalescence. Such artefacts are caused by unabsorbed or poorly-absorbed ink droplets interacting undesirably on or near the surface of the substrate.

Examples of this kind of poorly-absorbing substrate include many paper substrates designed more specifically for other forms of printing, such as lithographic, flexographic, gravure, letterpress, electrophotographic or thermal printing: printing processes in which smaller volumes of more concentrated, more viscosity ink, or different ink forms, are used, thereby avoiding the occurrence of these kinds of artefacts. Other examples include some synthetic papers, such as Tyvek™ or Teslin™. The worst cases in this respect are substrates that are completely impermeable, where no ink is absorbed by the substrate and all the ink remains on the substrate surface.

The term 'downstream' with regard to the location of the printing units is defined as any location after the printing units, and in line with the printing units, wherein the relative direction of these locations is defined as the direction of the flow of the substrate through the printing system.

A 'functional material' is a material that provides a particular desired mechanical, electrical, magnetic or optical property. As used herein the term 'functional material' refers to a colorant, such as a pigment dispersion or dye solution, magnetic particles, conducting or semi-conducting particles, quantum dots, metal oxide, wax or non-'switching' polymer (as core polymer). Preferably the functional material, however, is a pigment dispersion or a dye solution.

As used herein with respect to viscosity and volume, the terms 'first lower' and 'second higher', refer to the viscosity and volume differentials of the composition in the printhead(s) and on the substrate respectively.

Thus as disclosed therein polymer particles can be added to a functional material in order to alter the viscosity of the ink in response to an external stimulus, such that on jetting an ink drop onto a substrate the drop is immobilized thereon.

The external stimulus is preferably temperature change, whereby the polymeric particles comprising discrete particles, (which may optionally include a functional material) are 'thermally-responsive'. However the external stimulus may be, for example, light, redox potential, electrical or magnetic or a combination thereof, as described in WO 2008/075049.

Thus if the external stimulus causing the composition to change from one rheological state to another is temperature change, such that the polymeric particles are thermally-responsive, the substrate onto which the ink is deposited would normally be at a significantly lower temperature than the ink passing through the inkjet print head, the difference between the temperature at which the ink adopts the first and second rheological state being defined herein as the temperature differential. The viscosity of the ink is thereby altered from a lower viscosity fluid in the inkjet printhead to a higher viscosity fluid or a viscoelastic solid on the substrate.

Commonly assigned patent application entitled "INKJET PRINTING SYSTEM," GB Application No. 0811711.1, filed Jun. 26, 2008, and the corresponding PCT application designating the United States of America describes means for cooling the substrate prior to or during deposition onto the substrate to induce the change in rheological state from the first to the second state and hence immobilisation of the droplets of ink under all prevailing, variable ambient conditions. The details of such cooling systems as described therein are incorporated herein by reference.

Figure 1B:
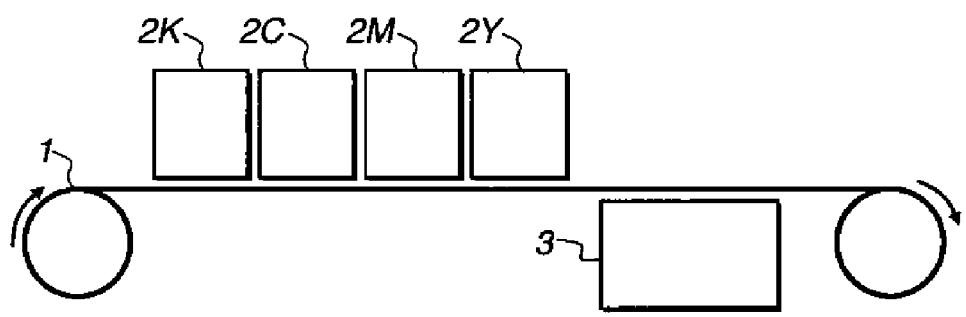

FIG. 1 illustrates two embodiments of a printing system comprising a poorly-absorbing or impermeable substrate (1), which may be a series of individual sheets or a continuous web, a plurality of static printing units, 2C (cyan), 2M (magenta), 2Y (yellow) and 2K (black), arranged as close as is practicable in succession without any interstation units interposed and where each printing unit deposits aqueous inkjet ink of the composition described above, and a means of drying (3) the ink patterns deposited by the printing units, which is positioned downstream of the plurality of printing units. The drying unit can also be positioned either side relative to the substrate.

The printing units (2C, 2M, 2Y, 2K) can themselves comprise a plurality of printheads, wherein the printheads can be any of the many variations of drop-on-demand (DOD) or continuous inkjet devices, or combinations of different types of said printhead devices. The printing units all deposit aqueous ink of the said ink composition as described above but, within the defined composition, the inks in each printing unit may differ in some particular of formulation. For example, the colorant used in the ink deposited by a particular printing unit may vary so that colour printing can be achieved. This usually requires the facility to deposit patterns of, at least, cyan, magenta, yellow and preferably also black ink droplets, individually, but more often in various pattern combinations. Alternatively or additionally the colorant concentration can be selected to provide either a 'dark' or 'light' ink, as explained hereinafter. Other additional printing units can be included if it is necessary to print specific colours, for example, 'spot colours', or the colours needed to extend the colour gamut produced by the printer, for example, an orange or a violet.

The means of drying can be one or more of a number of methods that rely on conduction, convection or radiation, or any combination thereof. Generally a stream of gas, such as air, applies beat by convection and carries away the vapour as humidity. Natural air drying can also be used whereby the printed droplet patterns are dried with unheated forced air, taking advantage of its natural drying potential. Alternative methods of drying include contact drying, wherein heat is supplied by contact conduction or radiation; infra-red drying wherein efficiency is achieved by matching the wavelength of the infra-red heater to the absorption characteristics of the material; or dielectric drying, wherein radio-frequency or microwaves are absorbed inside the material; or a combination thereof.

The change in rheological states of the stimulus-responsive particles equates to differences in size or shape or more particularly volume, represented by equivalent spherical diameter of the particles in the inkjet printhead from that on the substrate, the term equivalent spherical diameter being used in its art recognized sense in recognition of particles that are not necessarily spherical. Thus the stimulus-responsive particles are in a collapsed state in the inkjet printhead, having an equivalent spherical diameter considerably less than the diameter of the inkjet nozzle to prevent blockage and enable jetting, typically less then 0.5 μm, preferably 0.3 μm or less, more preferably 0.15 μm or less and especially 0.1 μm to 0.054 μm.

Figure 2:
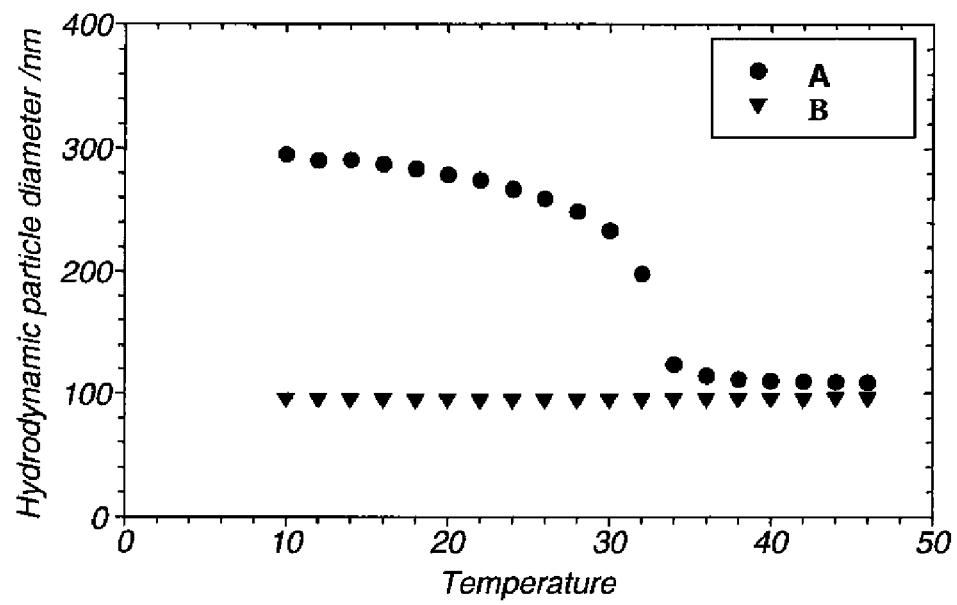
FIG. 2 is a graph of hydrodynamic particle diameter v. temperature of a thermally-responsive particle (Curve A) and a latex polymer (Curve B).
Figure 3:
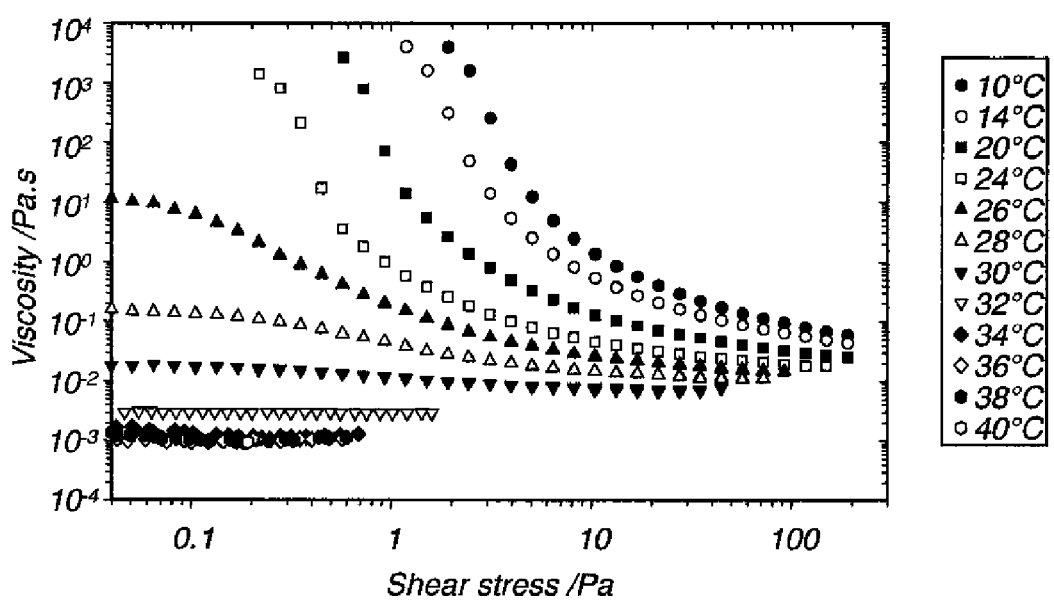
FIG. 3 is a graph of viscosity v. shear stress at a range of temperatures from 10° C. to 40° C. of the thermally-responsive particles in water at a concentration of 4% w/w.

Since the temperature of the substrate in the preferred embodiment will be lower, this causes an expansion of the stimulus-responsive particles on hitting the substrate, as shown in Curve A in FIG. 2, and hence a rapid increase in viscosity, as shown in FIG. 3. This can be contrasted with the use of a non-stimulus-responsive latex polymer (Curve B in FIG. 2) wherein no expansion and hence no such increase in viscosity occurred. The increase in viscosity reduces the tendency for the printed droplets to flow or coalesce with other printed droplets on the substrate surface, reducing the number of printed defects.

The 'switching temperature' can be fine-tuned to adapt to exterior conditions by appropriate selection and quantity of the thermally-responsive polymer particles and/or by the inclusion/exclusion or adjustment of concentration of other components in the composition. However it is desirable that the viscosity change from a lower to higher viscosity, and a concomitant volume change from a lower to a higher volume induced by the temperature change, occurs over as small a temperature range as possible.

This increase in viscosity is a factor of at least ten, preferably a factor of at least thirty, more preferably a factor of at least one hundred, and most preferably a factor of at least one thousand. The viscosity of the ink in the printhead corresponds to that determined at low shear (for example $10s^{-1}$), while on the substrate the viscosity corresponds to that measured at low stress (for example 0.01 Pa).

Figure 4:
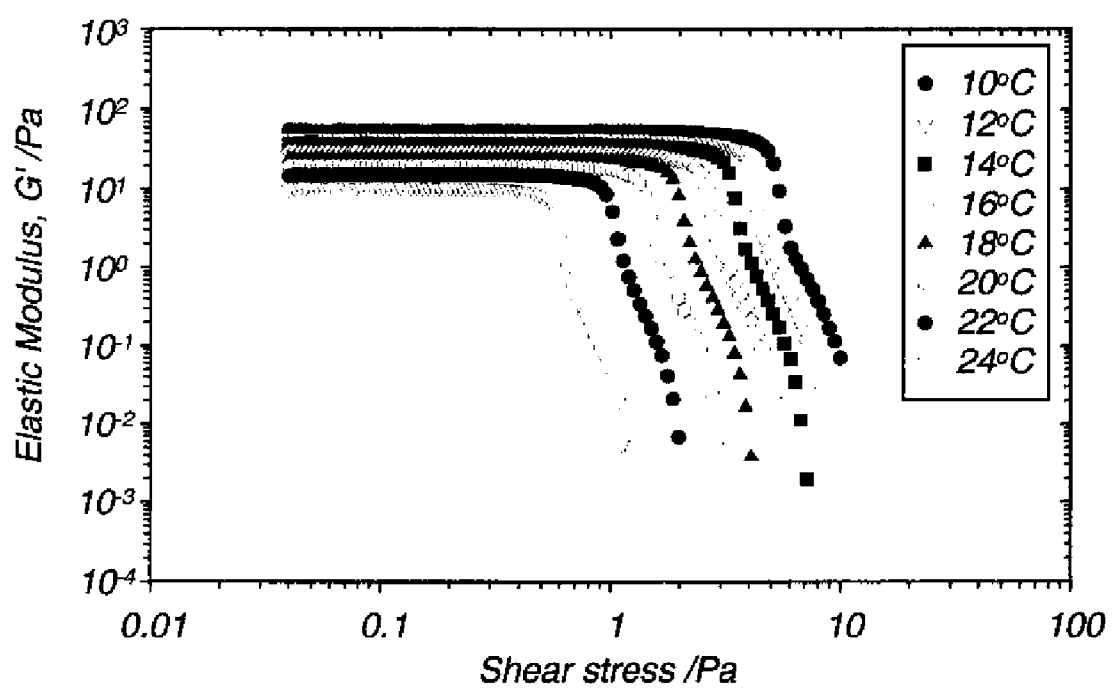
FIG. 4 is a graph of elastic modulus v. stress at a frequency of 1 rad·s$^{-1}$ at a range of temperatures from 10° C. to 24° C. of the thermally-responsive particles in water at a concentration of 4% w/w.

Thus the viscosity of the composition in the printhead may typically have a viscosity similar to water, namely about $10^{-3}$ Pa·s. The low shear viscosity on the substrate may, however, typically be about $10^3$ Pa·s. FIG. 4 shows an increase in yield stress as temperature falls, such that the suspensions have elastic properties at 24° C. and below.

The invention is also applicable, however, to polymer particles which are responsive to other than temperature change such as, for example, changes in pH or light or an electrical or magnetic change or a combination thereof For example if an azo moiety were included in the polymer in the composition, it would be possible to illuminate a drop after leaving the printhead to change its morphology. Alternatively, if the stimulus were pH, it would be possible to initially print the substrate with another ink composition, for example one having an alkaline pH, and then print the ink composition of the invention thereon, having for example an acidic pH, onto the first drop to react therewith. The skilled person would readily appreciate alternative forms of enabling a significant viscosity change in response to a number of external stimuli to achieve the benefit of the present invention. In all cases it is desirable that the switching point from one rheological state to another occurs over as small as a range as possible.

Figure 5:
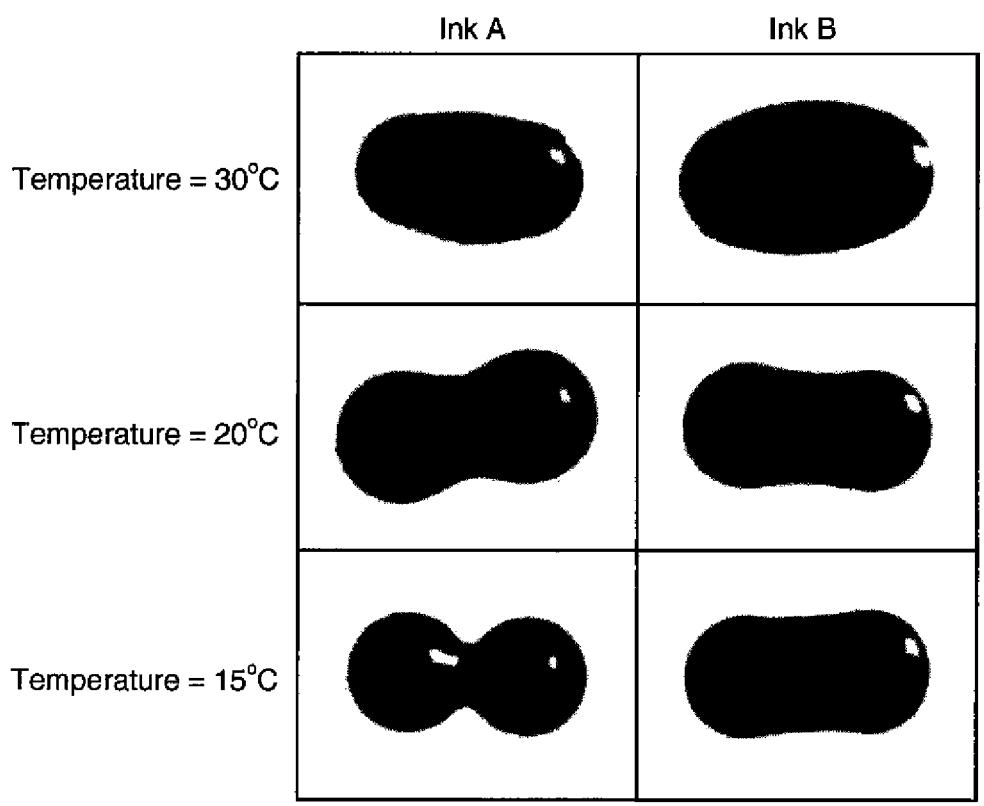
FIG. 5 is a comparison of the effect of substrate temperature on coalescence of dye-based ink droplets, which were warmed to 31° C. and applied simultaneously onto an impermeable substrate, the comparative ink droplets lacking the stimulus-responsive polymeric particles of the ink droplets in the inventive system.

FIG. 5 illustrates the effect of reduction in image resolution resulting when two drops of comparative Ink A, i.e. not containing stimulus-responsive polymer particles were warmed to 31° C., and applied simultaneously and in close proximity to the surface of an impermeable substrate, such that upon wetting out the two droplets touched, as described hereinafter in Example 5. When the droplets touched they coalesced immediately.

Figure 6:
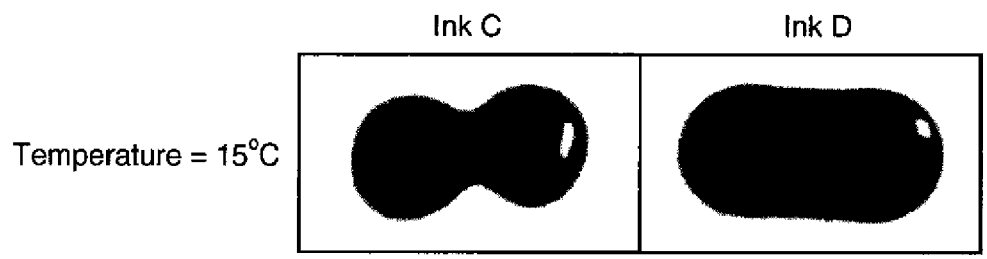
FIG. 6 is a comparison of pigment-based inks warmed to 31° C. and applied to an impermeable substrate at 15° C., wherein Ink C is an ink comprising thermally-responsive particles and Ink D is a comparative ink composition.

However when the procedure was repeated with Ink B, comprising stimulus-responsive polymer particles, when the droplets touched, the degree of coalescence was found to depend on the temperature of the substrate surface and hence the temperature of the ink on that surface. The lower the temperature of the ink, the higher the ink viscosity became, thereby immobilising the droplets on the surface and preventing coalescence. Analogously FIG. 6 shows the result of a comparable experiment with pigment-based Inks C and D.

The stimulus-responsive polymers for use in the printer system of the invention may be prepared, for example, by polymerization of monomers which will impart thermal sensitivity, such as N-alkylacrylamides, such as N-ethylacrylamide and N-isopropylacrylamide; N-alkylmethacrylamides, such as N-ethylmethacrylamide and N-isopropylmethacrylamide; vinylcaprolactam, vinyl methylethers, partially-substituted vinylalcohols, ethylene oxide-modified benzamide, N-acryloylpyrrolidone, N-acryloylpiperidine, N-vinylisobutyramide, hydroxyalkylacrylates, such as hydroxyethylacrylate; hydroxyalkylmethacrylates, such as hydroxyethylmethacrylate; and copolymers thereof, by methods known in the art. The thermally-responsive polymer particles can also be prepared by micellisation of thermally-responsive polymers such as, for example, certain hydroxyalkylcelluloses, aspartic acid, carrageenan, and copolymers thereof, and crosslinked while in micelles.

The polymerization may be initiated using a charged or chargeable initiator species, such as, for example, a salt of the persulfate anion, or with a neutral initiator species if a charged or chargeable co-monomer species is incorporated in the preparation, or alternatively by light or heat.

Alternatively copolymers of the stimulus-responsive particles may be created by incorporating one or more other unsubstituted or substituted polymers such as, for example, polyacrylic acid, polylactic acid, polyalkylene oxides, such as polyethylene oxide and polypropylene oxide, polyacrylamides, polyacrylates, polyethyleneglycol methacrylate, polyvinyl alcohol, polyvinyl acetate, polyvinylpyrrolidone, polyvinyl chloride, polystyrene, polyalkylene-imines, such as polyethyleneimine, polyurethane, polyester, polyurea, polycarbonate or polyolefines. Introduction of a copolymer, such as polyacrylic acid or polyethyleneglycol methacrylate, may be useful to fine-tune the switching temperature and swellability.

Any polymeric acidic groups present may be partially or wholly neutralized by an appropriate base, such as, for example, sodium or potassium hydroxide, ammonia solution, alkanolamines such as methanolamine, dimethylethanolamine, triethylethanolamine or N-methylpropanolamine or alkylamines, such as triethylamine. Conversely, any amino groups present may be partially or wholly neutralized by appropriate acids, such as, for example, hydrochloric acid, nitric acid, sulfuric acid, acetic acid, propionic acid or citric acid. The copolymers may be random copolymers, block copolymers, comb copolymers, branched, star or dendritic copolymers.

Particularly preferred stimulus-responsive polymers are for example, a poly-N-alkylacrylamide, especially poly-N-isopropylacrylamide, and a poly-N-alkylacrylamide-co-acrylic acid, especially poly-N-isopropylacrylamide-co-acrylic acid, poly-N-isopropylacrylamide-co-polyethyleneglycol methacrylate, polyhydroxyalkylcellulose, especially polyhydroxypropylcellulose, polyvinyl-caprolactam, polyvinylalkylethers or ethyleneoxide-propylene oxide block copolymers.

The number of monomer units in the stimulus-responsive polymer particles may typically vary from about 20 to 1500 k. For example the number of monomer units in poly-N-isopropylacrylamide is from 200-500 k and in polyvinyl-caprolactam is from 20 to 1500 k.

Typically the ratio of hydrophobic moiety to hydrophilic moiety in the stimulus-responsive polymer particles is about 50% although the ratio can be as high as 80%.

Generally a cross-linker may be required to maintain the shape of the polymer particle, although too high a concentration of cross-linker may inhibit the swellability in response to the temperature change. If there is an alternative way of maintaining particle architecture, such as a core particle in a stimulus-responsive polymer shell, it may be possible in some instances, however, to exclude a cross-linker.

Suitable cross-linkers for this purpose are as disclosed in WO 2008/075049 and in particular N,N'-methylenebis-acrylamide, N,N'-ethylenebisacrylamide, dihydroxyethylene bisacrylamide, N,N' bisacryloylpiperazine, ethylene glycol dimethacrylate, glycerin triacrylate, divinylbenzene, vinylsulfone or carbodiimides. The quantity of crosslinker should normally be in the range of about 0.1-10 mol %.

The polymer particle may also be in the form of a core/shell particle wherein the polymer surrounds a core forming a shell, such that the functional material is itself incorporated into the polymer particles, as described in WO 2008/075049. The polymer may be chemically bonded thereto, in which case a cross-linker would not normally be necessary, or physically associated therewith, wherein the core is encapsulated within the polymer shell. The core could be functionalised or non-functionalised polystyrene, latex or silica, or titania, a hollow sphere, magnetic or conductive particles or could comprise an organic pigment.

The size and shape of the stimulus-responsive polymer particles needs to be appropriate to the size and shape of the orifice, as well as any filters, through which it has to pass. Since the stimulus-responsive particles are generally approximately spherical, these particles can be made about the same equivalent spherical diameter as conventional pigment particles, knowing that those particles are proven to be reliably jettable.

When printing, the quantity of a functional material contained in an ink composition, for example a colorant, is defined by the printing purpose. For example, the colorant concentration could be selected such that a so-called 'dark' or 'light' ink were produced, where 'light' refers to an ink formulation containing a lower concentration of colorant, of similar hue, to a 'dark' ink. It is preferable that the quantity of functional material, such as a colorant, namely pigment or dye, in an ink composition is from about 0.1 wt % to about 30 wt %, more preferably from about 0.5 wt % to about 15 wt %, most preferably from about 0.5 wt % to about 10 wt %.

The amount of stimulus-responsive polymer particles is determined experimentally and sufficient must be added for the purpose and in most cases the amount of polymer particles will be in the range of about 0.5 to about 20 vol. %. However, conveniently a form of the Krieger-Doughty equation, which relates the particle addition needed to the change in particle diameter, may be used, as described in WO 2008/075049.

Although the ink composition is primarily water-based, it may be suitable in some instances to include a small amount of an organic solvent, for example up to 10% of a solvent such as, for example, ethanol or methylethyl ketone to improve drying speed on the substrate.

Generally humectants are employed in inkjet compositions to help prevent the ink from drying out in the printhead and to modify ink viscosity. However it can be a particular advantage of the present invention for a continuous inkjet system that a humectant may not be required. This can be particularly useful when printing onto impermeable media surfaces when the humectant can not be absorbed into the media but has to be removed by evaporation. Nevertheless, the addition of one or more humectants in the ink composition is not precluded. Examples of humectants which could be used, if required, are those described in co-pending WO 2008/075049.

Surfactants may be added to the ink to adjust the surface tension to an appropriate level or to prevent aggregation of the thermally-responsive polymer. The surfactants may be anionic, cationic or amphoteric but should normally be selected such that it is either uncharged (non-ionic), has no net charge (amphoteric) or matches the charge of the stimulus-responsive polymer used. The most preferred surfactants include acetylene diol derivatives, such as Surfynol® 465 (available from Air Products Corp.) or alcohol ethoxylates, such as Tergitol® 15-S-5 (available from Dow Chemical Co.). The surfactants can be incorporated at levels of 0.01 to 1% of the ink composition.

Additional polymers, emulsions, latexes or biocides may be used in the inks for use in the present invention. A biocide may be added to the ink composition to suppress the growth of microorganisms such as moulds, fungi, etc. in aqueous inks. A preferred biocide for the ink composition employed in the present invention is Proxel® GXL (Avecia Corp.) at a final concentration of 0.0001-0.5 wt. %, preferably 0.05-0.5 wt %.

Additional additives which optionally may be present include thickeners, conductivity-enhancing agents, anti-kogation agents, drying agents, anti-corrosion agents, defoamers and penetrants, additional polymers, emulsions, latexes or biocides, all as described in WO 2008/075049.

In some instances it may be appropriate to include a binder, such as a styreneacrylic or polyurethane resin, to provide robustness to the ink, providing the resin does not cross-link in the orifices in the printhead.

The pH of the aqueous ink compositions employed in the invention may be adjusted by the addition of organic or inorganic acids or bases. Useful inks may have a preferred pH of from 2 to 11, preferably 7 to 9, depending upon the type of dye being used.

The inks used in the various inkjet printers and in accordance with the present invention comprising a functional material are preferably colorants and can be dye-based or pigment-based, although pigment-based inks are preferred since they provide enhanced image stability, especially light stability. The method of preparing the pigment ink and examples of suitable pigment inks and dye-based inks are all contained in WO 2008/075049. Preferably the dispersion is a pigment dispersion selected from IDIS™ 40, PNB 15-3 (cyan), PR122 (magenta) or PY74 (yellow) or carbon black. A suitable dye colorant is Duasyn™ KRL-SF.

The substrate for the ink jet recording element used in the invention is selected from poorly-absorbing substrates, such as paper substrates designed and manufactured specifically for other forms of printing, for example, lithographic, flexographic, gravure, letterpress, electrographic or thermal printing, as hereinbefore described, and 'low energy' impermeable substrates, such as, for example, polyethylene, polypropylene, polyvinylchloride, polymethyl-methacrylate, polystyrene, polyurethane, polycarbonate, nylon, rubber, silicone, glass, diamond, borosilicates, silicon, germanium and metals such as aluminium, steel or copper. The invention is particularly suitable for printing onto non-linear surfaces, such as food packets and food cans.

Normally printing onto low energy substrates often involves the use of corona discharge treatment or prior treatment with primers to enable good adhesion to the substrate. It is a feature of this invention that such pretreatments are not usually necessary.

Further coating compositions may be applied to the substrate printed in accordance with the present invention by any number of well known techniques, including dip-coating, wound-wire rod coating, doctor blade coating, rod coating, air knife coating, gravure and reverse-roll coating, slide coating, bead coating, extrusion coating, curtain coating and the like.

The patents and publications referred to herein are incorporated by reference in their entirety.

The invention will now be described with reference to the following examples, which are however, in no way to be considered limiting thereof.

EXAMPLES

Example 1

Preparation of Thermally-Responsive Polymer Particles 15.8 g N-isopropylacrylamide (obtainable from Aldrich), 0.301 g N,N'-methylenebisacrylamide (obtainable from Aldrich) and 0.31 g sodium dodecyl sulfate (SDS) were added to a 1 l double-walled glass reactor equipped with a mechanical stirrer and condenser. 900 ml water was added and the mixture warmed to 40° C., purged with nitrogen for 30 min. while being stirred at 500 rpm. The solution was then heated to 70° C. and 0.60 g potassium persulfate initiator (dissolved in 100 ml deionised water which had been purged with nitrogen) was added quickly to the reactor. The mixture was stirred at 400 rpm at 70° C. for 5 h under nitrogen. The reaction mixture rapidly became opalescent then became white. The heating was switched off and the mixture left to cool down to room temperature. The reaction yielded a white latex which was filtered, then dialysed until the conductivity of the permeate was less than 10 µS. The dialysed latex was freeze-dried yielding approximately 15 g of poly-N-isopropylacrylamide powder.

The particle size of the suspension of the thermally-responsive particles was measured as a function of temperature from 10 to 50° C. by photon correlation spectroscopy (PCS) using a Malvern Zetasizer™ 3000HS. A dilute sample of thermally-responsive particles was obtained directly from the preparation vessel and was diluted with 1 mM sodium chloride solution to obtain a count rate in the Zetasizer instrument of from 100,000 to 500,000 counts/sec.

FIG. 2 shows the typical particle diameters for a suspension of thermally-responsiveparticles (represented by Curve A) and a thermally-unresponsive latex (represented by Curve B).

The viscosity of the suspension of thermally-responsive particles in water at a concentration of 4% w/w was measured using a Bohlin™ CS50 rheometer with a bob-and-cup geometry (C2.3/26). The viscosity was measured as a function of shear stress from 10-40° C. A typical data set is shown in FIG. 3 for a 4% w/w suspension, showing that the low shear viscosity increases by four orders of magnitude on reducing the temperature from 34° C. to 26° C. Above 34° C., the viscosity is close to that of water, namely about $10^{-3}$ Pa·s. and shows little change with temperature. In contrast, at temperatures of 24° C. and below, studies in oscillatory shear show that the suspensions have elastic properties, as characterised by a yield stress that increases in value as temperature falls (FIG. 4)

The preparation of co-polymer particles which are thermally-responsive is described in WO 2008/075049.

Example 2

Preparation of a Typical Pigment Dispersion 30 g Monarch 880 carbon black (Cabot) was mixed with 214.4 g demineralised water, followed by 55.6 g Joncryl™ HPD96DMEA dispersant (available from Johnson Polymer). Zirconia beads of 0.6-0.8 mm diameter were added to the mixture, which was milled until the carbon black could not be milled down further. The zirconia beads were removed by filtration leaving a black dispersion with a mean particle size of 98 nm.

Example 3

Preparation of a Dye-Based Ink A Comprising Thermally-Responsive Particles 13.3 g of the 15.0 wt % solution of a black dye, Duasyn™ KRL-SF, was mixed with 66.7 g of a 7.5 wt % aqueous solution of the thermally-responsive polymer particles from Example 1, 0.5 g of the fluorocarbon surfactant Zonyl™ FSN and sufficient demineralised water was added to form 100 g of ink.

Example 4

Preparation of a Comparative Dye-Based Ink B 13.3 g of the 15.0 wt % solution of a black dye, Duasyn™ KRL-SF, was mixed with 0.5 g of the fluorocarbon surfactant Zonyl™ FSN and sufficient demineralised water was added to form 100 g of ink.

Example 5

Comparison of Effect of Substrate Temperature on Coalescence of Dye-Based Inks A and B Ink B was warmed to 31° C. before two droplets were applied simultaneously onto the surface of an untreated polyethylene substrate such that upon wetting out the two droplets touched. When the droplets touched they coalesced immediately. After 1 min when coalescence was complete, the droplets were photographed. This procedure was repeated but the temperature of the substrate surface was varied. Three experimental runs were performed with the substrate surface temperature maintained at 30° C., 20° C. and 15° C. and the results shown in FIG. 5.

In the same way, Ink A was warmed to 31° C. before two droplets were applied simultaneously onto the surface of an untreated polyethylene substrate such that upon wetting out the two droplets touched. When the droplets touched the degree of coalescence that occurred was found to depend on the temperature of the substrate surface and hence the temperature of the ink on that surface. The lower the temperature of Ink A, the higher the ink viscosity became (see FIG. 2), thereby immobilising the droplets on the surface and preventing coalescence. After 1 min, when any coalescence that might have occurred was complete, the droplets were photographed. This procedure was repeated but the temperature of the substrate surface was varied. Three experimental runs were performed with the substrate surface temperature maintained at 30° C., 20° C. and 15° C. and the results shown in FIG. 5.

Example 6

Comparison of Effect of Substrate Temperature on Coalescence of Pigment-Based Inks C and D These inks were made-up using the same procedures employed for Examples 3 and 4, except that a pigment Idis 40K (Evonik Degussa), was substituted in the same amount for the dye Duasyn KRL-SF to make Ink C, including a thermally-responsive polymer, and Comparative Ink D respectively.

Ink D was warmed to 31° C. before two droplets were applied simultaneously onto the surface of an untreated polyethylene substrate previously cooled to 15° C., such that upon wetting out the two droplets touched. When the droplets touched they coalesced immediately. After 1 min the droplets were photographed.

In the same way, Ink C was warmed to 31° C. before two droplets were applied simultaneously onto the surface of an untreated polyethylene substrate previously cooled to 15° C., such that upon wetting out the two droplets touched. When the droplets touched the degree of coalescence was much reduced because of the increase in viscosity induced by the presence of the thermally-sensitive polymer particles. After 1 min., when any coalescence that might have occurred was complete, the droplets were photographed (FIG. 6).

| PARTS LIST: | |
|---|---|
| 1 | substrate |
| 2C | static printing unit (cyan) |
| 2K | static printing unit (black) |
| 2M | static printing unit (magenta) |
| 2Y | static printing unit (yello) |
| 3 | drying means |

The invention claimed is:

1. An inkjet printing system comprising
   (a) a plurality of static inkjet printing units each comprising at least one inkjet printing head;
   (b) an ink-receiving element comprising a poorly-absorbing or impermeable substrate;
   (c) an aqueous inkjet composition which comprises a polymeric compound comprising discrete particles responsive to an external stimulus, and a functional material, wherein the functional material may be incorporated as part of the polymeric particles, the particles causing the composition to have a first rheological state and a different second rheological state in response to a stimulated change in conditions, the first rheological state being associated with a first lower viscosity of the composition, wherein the particles have a first lower volume, enabling the composition to pass through an inkjet printhead orifice and the second rheological state being associated with a second higher viscosity of the composition, wherein the particles have a second higher volume, enabling immobilisation of droplets of the composition on a substrate therefore; and
   (d) means of drying the aqueous ink compositions only positioned downstream of the plurality of printing units.

2. A system according to claim 1 wherein the substrate is an impermeable substrate.

3. A system according to claim 2 wherein the polymeric particles in the aqueous inkjet composition are derived from monomers selected from the class consisting of N-alkylacrylamides, N-alkyl-methacrylamides, vinylcaprolactam, vinyl methylethers, partially-substituted vinylalcohols, ethylene oxide-modified benzamide, N-acryloylpyrrolidone, N-acryoylpiperidine, N-vinylisobutyramide, hydroxyalkylacrylates, hydroxyl-alkylmethacrylates, and copolymers thereof.

4. A system according to claim 2, wherein the polymeric particle in the aqueous inkjet composition is poly-N-isopropyl-acrylamide, poly-N-isopropylacrylamide-co-acrylic acid or poly-N-isopropyl-acrylamide-co-polyethyleneglycol methacrylate.

5. A system according to claim 2 wherein the impermeable substrate is selected from polyethylene, polypropylene, polyvinylchloride, polymethylmethacrylate, polystyrene, polyurethane, polycarbonate, nylon, rubber, silicone, glass, diamond, germanium, borosilicate, germanium, aluminium, steel and copper.

6. A system according to claim 5 wherein the polymeric particles in the aqueous inkjet composition are derived from monomers selected from the class consisting of N-alkylacrylamides, N-alkyl-methacrylamides, vinylcaprolactam, vinyl methylethers, partially-substituted vinylalcohols, ethylene oxide-modified benzamide, N-acryloylpyrrolidone, N-acryoylpiperidine, N-vinylisobutyramide, hydroxyalkylacrylates, hydroxyl-alkylmethacrylates, and copolymers thereof.

7. A system according to claim 5, wherein the polymeric particle in the aqueous inkjet composition is poly-N-isopropyl-acrylamide, poly-N-isopropylacrylamide-co-acrylic acid or poly-N-isopropyl-acrylamide-co-polyethyleneglycol methacrylate.

8. A system according to claim 1 wherein the poorly-absorbing substrate is a porous substrate designed for lithographic, flexographic, gravure, letterpress, electrophotographic or thermal printing, including a synthetic substrate.

9. A system according to claim 1 wherein at least two of the printing units deposit inks of different formulations of colour and/or concentration.

10. A system according to claim 9 wherein at least three of the printing units deposit a cyan ink, a magenta ink and a yellow ink.

11. A system according to claim 1 wherein at least one printhead deposits a black ink.

12. A system according to claim 1 wherein the polymeric particles in the aqueous inkjet composition are derived from monomers selected from the class consisting of N-alkylacrylamides, N-alkyl-methacrylamides, vinylcaprolactam, vinyl methylethers, partially-substituted vinylalcohols, ethylene oxide-modified benzamide, N-acryloylpyrrolidone, N-acryoylpiperidine, N-vinylisobutyramide, hydroxyalkylacrylates, hydroxyl-alkylmethacrylates, and copolymers thereof.

13. A system according to claim 1, wherein the polymeric particle in the aqueous inkjet composition is poly-N-isopropyl-acrylamide, poly-N-isopropylacrylamide-co-acrylic acid or poly-N-isopropyl-acrylamide-co-polyethyleneglycol methacrylate.

14. A system according to claim 1 wherein the polymeric particles in the aqueous inkjet composition have an equivalent spherical diameter of 0.15 µm or less in the printhead.

15. A system according to claim 1 wherein a cross-linker is present in the aqueous inkjet composition to link functional groups between polymer chains in an amount of from 0 to about 10 mol %.

16. A system according to claim 1 wherein the polymeric particles in the aqueous inkjet composition are core/shell particles wherein the polymer surrounds a core and is chemically bonded thereto or physically associated therewith, wherein the core is encapsulated within the polymer shell.

17. A system according to claim 1 where the functional material is selected from a colorant, magnetic particles, conducting or semi-conducting particles, quantum dots, metal oxide, wax or a core polymer.

18. A system according to claim 1 wherein the functional material is a pigment dispersion or a dye solution.

19. An inkjet printing method comprising the steps of
A) providing an ink jet printer comprising a plurality of static inkjet printing units each comprising at least one inkjet printhead, the printing units being responsive to digital data signals;
B) loading the printer with an ink-receiving element comprising a poorly-absorbing or impermeable substrate;
C) loading the printer with an aqueous inkjet ink composition according to claim 1;
D) using a first printing unit, applying a first pattern of droplets on the ink-receiving element using the aqueous inkjet ink composition in response to the digital data signals;
E) using subsequent printing unit or units, directly applying subsequent patterns of droplets on the same ink-receiving element using the aqueous inkjet ink composition in response to the digital data signals; and
F) subsequently drying the patterns of droplets.

20. An inkjet printing method according to claim 19, wherein the inkjet printer comprises a continuous inkjet printing system.

* * * * *